Sept. 7, 1943.  I. E. COFFEY  2,329,156
BRAKE HOLDING MECHANISM
Filed Oct. 23, 1940
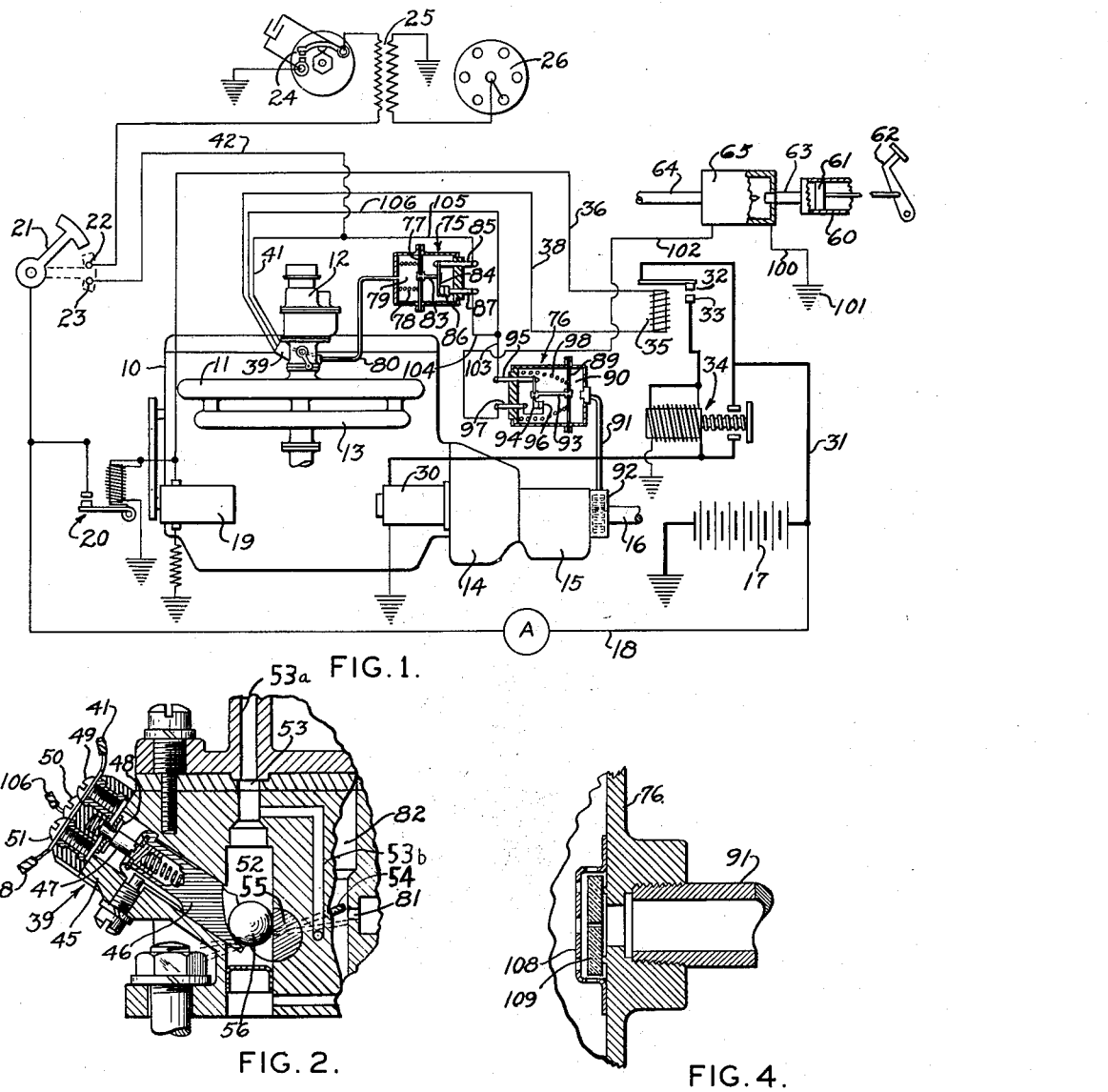
FIG. 1.
FIG. 2.
FIG. 4.
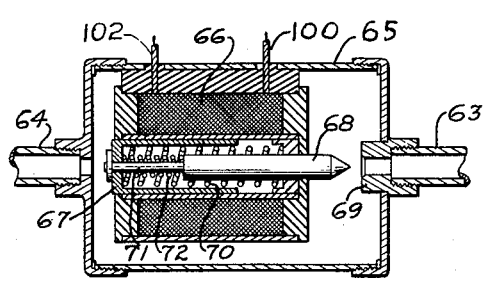
FIG. 3.
INVENTOR
IRVEN E. COFFEY
Donald U. Rich
ATTORNEY Patented Sept. 7, 1943

2,329,156

UNITED STATES PATENT OFFICE 2,329,156

BRAKE-HOLDING MECHANISM

Irven E. Coffey, Normandy, Mo., assignor to George R. Ericson, Kirkwood, Mo., as trustee Application October 23, 1940, Serial No. 362,351

11 Claims. (Cl. 192—3)

This invention relates to braking devices for vehicles and consists particularly in novel means for preventing release of the brakes, when once applied under certain conditions.

Devices heretofore suggested for locking vehicle brakes in applied condition have had certain disadvantages. Where these are applied to automobiles having fluid brakes, the brakes remain locked after the ignition switch is turned off with the result that the locking device is used for parking purposes. This is undesirable in view of the possibility of leakage in the brake system and accidental release of the brakes resulting therefrom. It is desirable to provide for automatically releasing the brakes when the accelerator pedal is depressed, but where the self-starter is actuated by depressing of the accelerator pedal, as is frequently the case, the brakes may be released during the starting operation, whereas they should remain locked to take care of the situation, for instance, where the vehicle has been stalled on a hill. Also, the throttle operated brake releasing devices have not been particularly sensitive to slight opening movement of the throttle. In some cases, the brake locking devices become operative immediately when the motion of the vehicle wheels has stopped, but this is a disadvantage on slippery pavements since such immediate locking of the brakes may result in a disastrous skid.

It is an object of the present invention to provide an automomatic brake holding device which is rendered inoperative as soon as the ignition key is turned off, so that the automatic device cannot be used as a parking brake.

Another object is to provide novel, sensitive means for insuring release of the brakes when the engine is accelerated.

Another object is to provide brake holding mechanism which becomes effective to prevent release of the brakes only following a predetermined interval after the vehicle wheels come to a stop, so as to facilitate driving on slippery pavements.

Still another object is to provide brake holding mechanism, particularly adaptable to the fluid type service brakes of automobiles and which is designed to function effectively only when needed without the disadvantages of previous brake holding devices.

These objects and other more detailed objects hereafter appearing are attained substantially by the mechanism illustrated in the accompanying drawing in which Fig. 1 is a view, partly diagrammatic, illustrating an automobile engine and various parts and wiring constituting the brake holding and related mechanism.

Fig. 2 is a sectional detail showing the throttle operated starter switch mechanism.

Fig. 3 is a sectional detail illustrating the magnetic, non-release check valve interposed in the braking system, and Fig. 4 is a sectional detail showing the means for delaying the locking of the brakes after the wheels have come to a stop.

In Fig. 1 the engine is shown at 10 including the usual intake manifold 11, mounting a carburetor 12, and exhaust manifold 13. Rearwardily of the engine is the usual clutch housing 14 and transmisison 15 from which extends the propeller shaft 16. The negative terminal of a battery 17 is connected by wire 18 to the generator 19 through the reverse current cutout 20 and to ignition switch 21. Switch 21 is provided with a pair of terminals 22 and 23, terminal 22 being connected to the usual ignition system including breaker points 24, spark coil 25 and distributor 26.

An electrical self starting device is provided at 30 and controlled by a primary circuit including lead 31 extending from the battery through relay points 32 and 33, and secondary solenoid mechanism generally indicated at 34. Relay solenoid 35 is controlled by a lead 36 which is grounded through the generator and a lead 38 which breaks through throttle operated switch 39 on the carburetor and thence connects by means of leads 41 and 42 to ignition switch terminal 23. Thus, when both the ignition switch 21 and the throttle operated switch 39 are closed, relay solenoid 35 will be energized to close points 32 and 33 which, in turn, energize solenoid mechanism 34 and starter motor 30 to crank the engine.

The throttle actuated switch device, as shown in Fig. 2, includes an inclined hollow casing 45 slidably receiving a plunger 46 which itself telescopingly receives a smaller plunger 47 to which is attached the switch blade 48. The switch is provided with three terminals, 49, 50 and 51, leads 41 and 38, previously described as controlling starter relay 35, being connected, respectively, to terminals 49 and 51. A vertical chamber 52 intersects plunger 46 and is connected by passage 53 and 53b to the carburetor suction posterior to the throttle 54. A branch 53a of the suction passage extends to the carburetor automatic choke control (not shown). The end of throttle shaft 55 extends into chamber 52 and is cutout, as shown, to provide a semi-circular cam element between which and the curved lower end of plunger 46 there normally rests a ball 56. When the engine is at rest and there is no suction in chamber 52, ball 56 forms an operative connection between the end of the throttle shaft and plunger 46 so that when the throttle is partially opened, starter relay 35 will be energized through terminals 49 and 51. When the throttle is thereafter released, ball 56 is picked up by the suction in chamber 52 so as to render the throttle switch ineffective to control the starter circuit.

This starter switch mechanism is shown and claimed in substantial detail in Coffey Patent #2,174,313.

At 60 there is shown a primary brake cylinder including plunger 61 connected to the usual brake pedal 62. Piping 63, 64 connects the primary cylinder with the secondary cylinders located adjacent the brake shoes, and, interposed in this piping, is a valve casing 65, shown in detail in Fig. 3.

Inside casing 65 there is mounted a solenoid 66 which slidably receives a hollow plunger 67 to which is secured a needle valve 68 having a tapered extremity adapted to seat against the protruding adjacent end of brake line piping 63, which forms a valve seat 69, so as to seal this piping against movement of fluid from the valve housing back into the primary cylinder 60, or in the direction to release the brakes. Plunger 67 and valve 68 are normally urged away from valve seat 69 by coiled spring 70. Valve 68 has a small stem 71 slidably received in the end of plunger 67 and the valve is yieldingly maintained in an extended position relative to the plunger by a second coiled spring 72.

Suitably mounted on the engine or vehicle framing, preferably in the vicinity of valve casing 65, are a pair of pressure actuated switch members, generally indicated at 75 and 76. Switch member 75 includes a casing formed in two parts and mounting a diaphragm 77 therebetween which is yieldingly urged toward the right by a coiled spring 78. On the left side of diaphragm 77 (Fig. 1) there is provided a pressure chamber 79 which communicates by means of a tube 80 and port 81 with a portion of the carburetor mixture conduit 82 just anterior to the edge of the throttle valve 54, when closed, this closed position of the throttle being shown in dotted lines in Fig. 2. Projecting from the opposite side of diaphragm 77 is a stem 83 secured to a movable switch point 84, in turn connected to a binding post 85. A stationary switch point 86 is connected to a second binding post 87. Spring 78, diaphragm 77, and the switch points are adjusted so that, normally, the switch is in closed position, but when the throttle valve is opened approximately to the solid line position shown in Fig. 2, with the engine in operation, diaphragm 77 is drawn to the left against spring 78 so as to open the switch.

Switch member 76 likewise includes a casing formed in two parts mounting a diaphragm 89 forming, at the right side thereof, (Fig. 1) a pressure chamber 90 which is in communication by means of a tube 91 with a small pump 92, which may be a gear or other suitable type of pump, and which is driven by or with propeller shaft 16. A stem 93 projects leftwardly from diaphragm 89 and is secured to a movable switch point 94 and to a binding post 95. A stationary switch point 96 is connected to a second binding post 97. A coiled spring 98 urges the diaphragm and the movable switch point toward the right so as to normally maintain the switch in closed position, as shown. Chamber 90, tube 91, and pump 92 form a closed system charged with suitable liquid and diaphragm 89, spring 98, and stem 93 are positioned and adjusted so that even slight movement of the vehicle wheels and the propeller shaft will operate pump 92 at a speed as to produce sufficient pressure to move diaphragm 89 to the left against spring 98 and open switch points 94 and 96.

The wiring for operating valve solenoid 66 in the brake system is as follows:

One connection 100 of the solenoid is grounded as at 101. The other connection 102 thereof is connected to binding post 97 of wheel actuated switch member 76. The opposite binding post 95 of this switch member is connected by a lead 103, 104 to binding post 87 of suction operated switch member 75. The opposite binding post 85 of this switch member is connected by leads 105, 41 to terminal 49 of throttle operated switch member 39, and by means of leads 105, 42 to battery energized ignition switch point 23.

The middle terminal 50 of throttle operated switch 39 is connected by means of a lead 106 directly to binding post 95 of wheel motion actuated switch 76. The arrangement of switch plate 48 in throttle switch device 39 is such that during the starting operation battery energized terminal 49 is electrically connected to both of the other terminals 51 and 50, the former being connected to starter relay 35, as explained heretofore, and the latter being connected through pressure actuated switch device 76 to valve solenoid 66.

A perforated cage 108 (Fig. 4) is secured to the inner end wall of valve member 76 and supports a perforated check valve disk 109 over the adjacent end of pressure tube 91 in such a manner that the check valve offers substantially no resistance to movement of the fluid in the direction to cause opening of switch 76 and consequent release of the brakes, but when the wheel motion is stopped, disk 109 is seated against the inner wall of the valve casing member so that the expulsion of fluid from the pressure chamber will be retarded and thus closing of switch points 94 and 96 by spring 98 and consequent seating of solenoid valve 68 will be delayed.

The operation is as follows:

Valve solenoid 66 will be energized so as to close valve 68 whenever the following three conditions exist:

(1) The ignition switch is in the "on" position, connecting both terminals 22 and 23 to the battery,
(2) Switch device 75 is closed, indicating either that the engine is not in operation or that the throttle valve is closed, and
(3) Switch device 76 is likewise closed, indicating that the vehicle wheels and propeller shaft 16 are stationary.

At such time all movement of braking fluid in a direction to release the brakes is prevented, although the force of the magnetic flux acting on plunger 67 is not sufficient to prevent movement of braking fluid in a direction to apply the brakes and, therefore, even though all three switches 20, 75 and 76 are closed, the brakes may be applied and, in such case, valve 68 operates simply as a non-return check. Just as soon as the throttle valve is opened, approximately to the extent indicated in solid lines in Fig. 2, so as to accelerate the engine, suction switch 75 will be broken, opening the control circuit for solenoid 66 and valve 68 will be released to be opened by spring 70.

In case the engine is stopped or has been stalled, depression of the throttle pedal sufficiently to operate the starter and crank the motor would tend to open switch 75 and thus render the brake holding device inoperative. To avoid this, the by-pass lead 106 is provided from throttle actuated switch 39 around suction switch 75 so that during cranking, even though switch 75 should be open, current will be led to wheel motion responsive switch 76 and thence to solenoid 66 so as to prevent release of the applied brakes. It is assumed that manual brake pedal 62 will not be released by the driver until the car has come to a stop so that pressure switch 76 always will be closed under conditions where the brake holding device is needed.

When the brakes are being applied to stop the vehicle, pressure switch 76 will, of course, remain open until the wheels come practically to a dead stop and thereafter, switch contacts 94 and 96 will close after a period of delay due to the seating of apertured check 109 to complete the circuit to the brake holding solenoid provided switch 75 is also closed, as described above.

Thus the brake holding device cannot become effective until a predetermined interval after the wheels have come to a stop so as to permit the driver to release his brakes immediately after the wheels stop if he so desires, as in case of a skid. The brakes will also be held in applied condition during cranking, but will be automatically released as soon as starter switch is opened and the throttle is opened to accelerate the engine. The brake holding feature is intended to be incorporated in the usual service brake system of the car which usually is not adapted to use as a parking brake. Due to the breaking of the control circuit for solenoid 66 through the ignition switch, the brake holding feature will be inoperative whenever the ignition is turned off. If the ignition switch is closed only to a position to energize terminal 22 and not terminal 23, the brake holding feature will likewise remain inoperative.

Various elements of the combination may be mounted in any suitable and convenient way and structural details of these elements are not essential. The exclusive use of all modifications as come within the scope of the appended claims is contemplated.

I claim:

1. In combination with a vehicle having brakes, means to lock the brakes in applied condition, said means including a control member movable between operative and inoperative positions, resilient means normally urging said member toward its operative position, means responsive to movement of the vehicle wheels to move said member to its inoperative position, and means for delaying the return of said member from its inoperative to its operative position after the wheel motion has stopped.

2. In combination with a vehicle fluid brake system, a valve in said system, and means to close said valve, after the vehicle has come to a stop, to prevent movement of brake fluid in said system in a direction to release the brakes, said means comprising an expansible chamber member operatively connected to said valve, resilient means normally urging said member in a direction to cause said valve to close, pressure producing means actuated with movement of the vehicle wheels to urge said member against said yielding means to cause said valve to open, and means to retard the movement of said chamber under the influence of said resilient means whereby locking of the brakes is delayed after movement of the vehicle has stopped.

3. The combination specified in claim 2 in which retarding means comprises an apertured check in the connection between said chamber member and said pressure producing means.

4. The combination in a vehicle including a fluid engine having a fluid inlet pipe, brakes, and means to lock the brakes in applied condition, of mechanism responsive to the change in pressure in said inlet pipe when the engine accelerated to release said locking means.

5. The combination in a vehicle having brakes, means to lock the brakes in applied condition, and an internal combustion engine including an induction pipe and a throttle therein, of a pressure chamber member operatively connected to said locking means, resilient means normally urging said member toward its operative position, and a fluid connection between said chamber member and a portion of said induction pipe anterior to said throttle for moving said chamber member toward its inoperative position, responsive to opening of said throttle to accelerate the engine, to release said locking means.

6. The combination with a vehicle having a fluid brake system and an engine having an induction pipe and a throttle therein, of a valve in said brake system, resilient means normally maintaining said valve in its open position, magnetic means functioning when energized to close said valve to prevent movement of fluid in said system in a direction to release the brakes, and an electrical circuit for said magnetic means having a normally closed control switch responsive to the suction in said induction pipe immediately anterior to said throttle, incident to opening of said throttle to accelerate the engine, to open said switch and de-energize said magnetic means.

7. The combination specified in claim 6 further including a second switch in said electrical circuit responsive to movement of the vehicle wheels to open said circuit.

8. The combination with a motor vehicle having an engine with an induction pipe, a self-starting device, and a fluid brake system, of a normally open valve in said system, and control mechanism for closing said valve to prevent movement of fluid therepast in a direction to release the brakes, said mechanism including means rendered operative to close said valve responsive either to the equalization of pressures inside and outside said induction pipe or to actuation of said starting device.

9. The combination with a motor vehicle having a self starter and brakes, of means to lock said brakes in applied condition, and control mechanism for said means including a part rendered operative responsive to actuation of said starter.

10. The combination with a motor vehicle having a fluid brake system and a self starter of a normally open non-release check valve in said brake system, of control means operative under predetermined conditions to yieldingly close said check valve so as to present movement of fluid therepast in the direction to release the brakes while permitting the movement of fluid therepast for applying the brakes, said means including a part rendered operative responsive to actuation of said starter.

11. The combination with a motor vehicle having brakes and a self starter, of means to lock said brakes, and control means for said locking means including devices responsive to actuation of said starter and the substantial absence of motion of the vehicle wheels to render said locking means operative.

IRVEN E. COFFEY.